United States Patent
Posa

[19]

[11] Patent Number: 6,115,960
[45] Date of Patent: Sep. 12, 2000

[54] DECORATIVE PLANT COVER

[76] Inventor: John G. Posa, 1204 Harbrooke, Ann Arbor, Mich. 48103

[21] Appl. No.: 09/109,522

[22] Filed: Jul. 2, 1998

Related U.S. Application Data

[63] Continuation-in-part of application No. 08/786,262, Jan. 22, 1997, Pat. No. 5,832,660.
[60] Provisional application No. 60/051,763, Jul. 7, 1997.

[51] Int. Cl.[7] .................................................. A01G 13/02
[52] U.S. Cl. ............................................................. 47/28.1
[58] Field of Search .............................. 47/2, 20, 21, 22, 47/26, 30, 31, 32, 72, 84, 28.1; 150/154, 901; 383/76

[56] References Cited

U.S. PATENT DOCUMENTS

| | | |
|---|---|---|
| 274,044 | 3/1883 | Smith . |
| 857,435 | 6/1907 | Bell ..................................... 150/154 X |
| 1,155,239 | 9/1915 | Iasigi . |
| 4,265,049 | 5/1981 | Gorewitz ..................................... 47/26 |
| 4,646,467 | 3/1987 | Morrisroe ..................................... 47/21 |
| 4,969,555 | 11/1990 | Fitsgerald ................................ 47/21 X |
| 5,255,765 | 10/1993 | Schrecongost ....................... 150/154 X |
| 5,347,750 | 9/1994 | Mills ........................................... 47/30 |
| 5,375,368 | 12/1994 | Motz ........................................... 47/30 |
| 5,479,741 | 1/1996 | Underwood ................................. 47/30 |
| 5,479,744 | 1/1996 | Meyer ......................................... 52/63 |

FOREIGN PATENT DOCUMENTS

| | | | |
|---|---|---|---|
| 1201381 | 12/1959 | France ..................................... 150/154 |
| 97853 | 5/1929 | Hungary ..................................... 47/30 |
| 585 | 12/1875 | Italy ............................................ 47/21 |
| 75309 | 7/1917 | Switzerland ............................... 47/21 |
| 12645 | 8/1890 | United Kingdom ....................... 47/21 |
| 331129 | 6/1930 | United Kingdom ................... 150/154 |
| 2129664 | 5/1984 | United Kingdom ....................... 47/30 |
| WO87/01904 | 4/1987 | WIPO ........................................ 47/30 |

*Primary Examiner*—John A. Ricci
*Attorney, Agent, or Firm*—Gifford, Krass, Groh, Sprinkle, Anderson & Citkowski, PC

[57] ABSTRACT

A sheet of material exhibiting a decorative floral pattern is used as a protective plant covering in conjunction with a plurality of removable fasteners. The sheet has a peripheral edge preferably defining an area sized to permit wrapping of the sheet in full, uncut form around a single, larger plant, or cutting of the sheet into multiple pieces to wrap a plurality of smaller plants on an individual basis. A non-woven material may be used so that it will not unravel if cut into sections. The material may also be at least semi-transparent to permit floral features of the plant to show through so that the material is less conspicuous when installed. Preferably a design element defining a cell is used having an area substantially less than that of the sheet, which is then replicated in a repeating manner to permit slitting, sectioning, and installation without regard for the orientation of the design. To assist the installed sheet in appearing more visually convincing, a process of producing the final product may include the steps of generating an image of a living plant, converting the image into a form suitable for printing, and printing the converted image onto the sheet. To correct for compression of the image on either side when the sheet is wrapped around a plant, the aspect ratio of the image may be adjusted so that the printed image appears more lifelike when the sheet is wrapped around the plant.

17 Claims, 6 Drawing Sheets

DECORATIVE PLANT COVER

REFERENCE TO RELATED APPLICATIONS

This application claims priority of U.S. provisional application Ser. No. 60/051,763, filed Jul. 7, 1997, and is a continuation-in-part of application Ser. No. 08/786,262, filed Jan. 22, 1997, now U.S. Pat. No. 5,832,660, the entire contents of both of which are incorporated herein by reference.

FIELD OF THE INVENTION

This invention relates generally to protective coverings for plants, bushes, shrubbery, and so forth during harsh or cold weather, and, more particularly, to an improved, more aesthetic covering which is more conformal to the shape of the plant to be protected, and one which is more easily stored during periods of non-use.

BACKGROUND OF THE INVENTION

During harsh or cold weather, it is a good practice to protect plants from the wind and the elements. Although some gardeners believe it is advantageous to "keep a plant warm," this is actually incorrect. In fact, if a plant is allowed to warm up at the wrong time, premature spring growth may occur, resulting in dieback in the event of a cold snap. Without protection, winter plant injury may be caused by severe cold or loss of moisture from shoots or branches. Although it is normal for plant moisture to slowly evaporate throughout the winter, during periods of bright winter sunshine, the effect of strong winds may accelerate this drying process to an unacceptable level.

Thus, is it best to protect plants from fluctuations in temperature, which may be accomplished through some form of wind-break. Two devices currently used for this purpose, burlap and Styrofoam "rose cones," both have drawbacks. Burlap is dirty, difficult to drape over plants without an additional supporting structure, and it eventually rots out. Also, its darker color may absorb solar energy and cause unwanted heating, particularly if wrapped too tightly.

Figures 1, 7A, 7B, 7C:
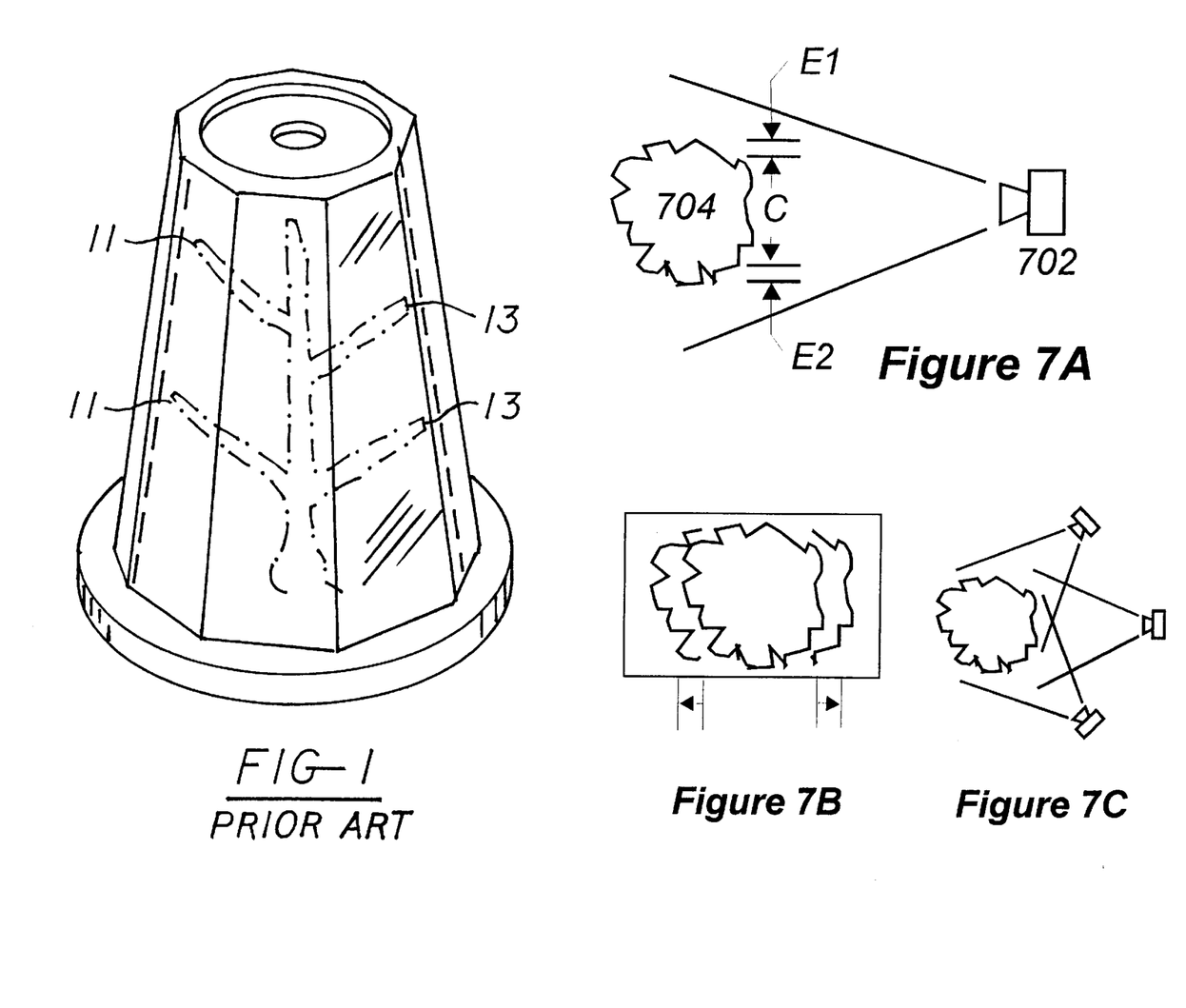
FIG. 1 illustrates, from an oblique perspective, a prior-art rose cone of the type which is ordinarily constructed of Styrofoam.
FIG. 7A is a top-down view illustrating how a living plant may be photographed in order to generate an image useful in printing floral indicia onto a sheet of material according to the invention.
FIG. 7B is a front-view of a living plant image illustrating how side-to-side image compression may be expanded for a more life-like appearance.
FIG. 7C is top-view drawing showing how a plurality of images may be gathered from different angles to produce an expanded image of the type shown in FIG. 7B.

The typical rose cone, shown in FIG. 1, is unattractive and non-recyclable. Although these units are designed to be stacked on top of one another, being rigid and non-collapsible, they consume a considerable amount of volume when stored. In addition, the cone or pyramid shape defined by the interior of such covers is not conformal to the shape of most plants, forcing users to prune the plant in an undesirable way just to fit the cover over the plant.

SUMMARY OF THE INVENTION

The present invention overcomes limitations of existing devices and techniques by providing a protective plant covering comprising a sheet of flexible material having two opposing side edges, and a plurality of fasteners, such that, with the material wrapped around the plant, the two side edges may be brought proximate to one another and adjustably fastened around and in physical conformity with the plant using the fasteners.

In the preferred embodiment, a durable sheet of material is provided having a decorative floral pattern imprinted onto at least one side thereof. The sheet has a peripheral edge preferably defining an area sized to permit wrapping of the sheet in full, uncut form around a single, larger plant, or cutting of the sheet into multiple pieces to wrap a plurality of smaller plants on an individual basis. A non-woven material may be used so that it will not unravel if cut into sections. The material may also be at least semitransparent to permit floral features of the plant to show through so that the material is less conspicuous when installed. The fasteners, which are preferably removable, may take the form of safety-pin type fasteners, clothes-pin type fasteners, skewers or other devices that may be selectively re-positioned onto the sheet to enhance conformity with the shape of the plant during installation.

The decorative floral pattern may be applied using silk-screening, flexographic printing, or other known processes. Preferably a design element defining a cell is used having an area substantially less than that of the sheet, which is then replicated in a repeating manner to permit slitting, sectioning, and installation without regard for the orientation of the design. If the material used is sufficiently porous, the ink used for printing will also bleed through, enabling the sheet to be installed with either side facing outwardly without visual ill-effects.

To cause the installed sheet to appear more convincing, a process of producing the final product may include the steps of generating an image of a living plant, converting the image into a form suitable for printing, and printing the converted image onto the sheet. To correct for compression of the image on either side when the image is gathered, the aspect ratio of the image may be adjusted so that the printed image appears more life-like when the sheet is wrapped around the plant.

DETAILED DESCRIPTION OF THE INVENTION

Figure 2:
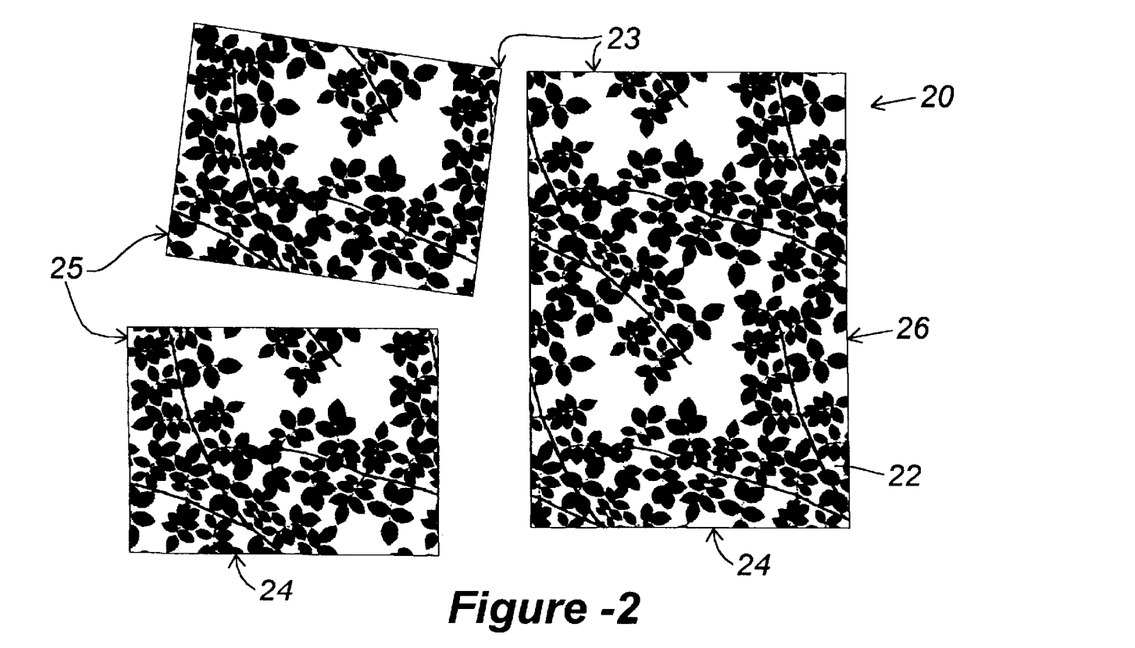
FIG. 2 is a drawing of a plant wrap according to the invention having a repeating floral pattern and an area sufficient to cover one larger plant or sectioned into pieces to cover a plurality of smaller plants.

Now making reference again to the drawings, FIG. 2 illustrates a plant wrap according to the invention indicated generally at 20 in unfolded form. Definitionally, the wrap 20 comprises a flexible sheet of material 22 having a top edge 23, a bottom edge 24, and two side edges 25 and 26, respectively. The sheet is preferably provided such that the edges define an area large enough to wrap around a single larger plant such as a rhododendron, magnolia, evergreen or small tree, or sectioned into pieces to cover a plurality of smaller rose bushes, azaleas, and so forth.

In a preferred embodiment, the sheet is imprinted with a decorative floral pattern created through the replication of cells creating a continuous pattern that may be cut or sectioned along any direction without noticeable visual ill-affect.

Figure 3:
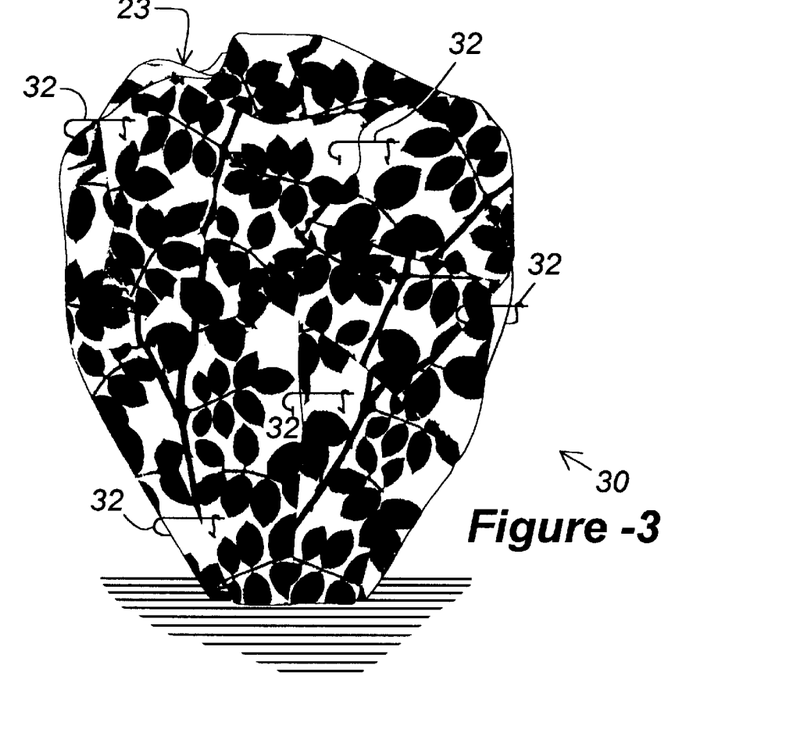
FIG. 3 is a drawing of a plant covering according to the invention installed on a plant to be protected and having decorative floral visual indicia imprinted on an outer surface.

FIG. 3 illustrates a covering according to the invention now installed onto a plant to be protected. Some advantages of the covering, shown generally at 30, are evident when the material is in place. In practice, during the installation process, the fasteners (32) may first be used to close the bottom portion of the material, then, the outer edge of the material may be overlapped or rolled to close the fasteners in bottom-up fashion until the top is reached. When the top of the material has been reached, the fasteners associated with the upper edge 23, may be used to create an enclosed wrap around the entire plant. Fasteners associated with the lower edge of the material may also be used to "cinch-up" the bottom edge of the material around the base of the plant. Conveniently, any unused fasteners may simply be left attached to the fabric during use or storage.

Among other advantages of the invention are that, in contrast to existing rigid devices, mulch may be easily added, particularly if the wrapping is secured around the bottom and worked upwardly, in which case the mulching material can simply continue to be packed in and around the plant, until the top edge is either closed or left open, at the user's option. Additionally, portions of the plant being protected may protrude through the covering of the invention, if the user chooses to have such features remain exposed instead of pruning them off. As one example, a climbing rose may simply be left on a trellis without having to trim it off. For that matter, the wrap according to the invention may be placed around the trellis itself, thereby eliminating the need to disturb plants in their growing environment.

In terms of materials, the wrap is preferably composed of a non-woven material such as spun-bonded polypropylene or other synthetic fabrics, including "CLAF." Such materials offer certain advantages, including a breathable nature, and the ability to make cuts in the material, if desired, for better conformity with a plant structure, without the risk of tearing, as there is no "grain." The lightest-weight versions also tend to be at least semi-transparent. In addition, in the event that silk-screening is used to apply the visual indicia, it has been found that, although the material does not withstand high oven temperatures for ink drying purposes, water-based and vinyl inks nevertheless penetrate entirely through the material, resulting in a very permanent design pattern. It should be apparent that various other materials, both organic and inorganic, may function equally well according to the invention. In particular, recycled plastics of different compositions may be used, and, in place of silk screening the outer design, different colors of plastic may simply be melted together to create floral imagery, for example.

Figure 4:
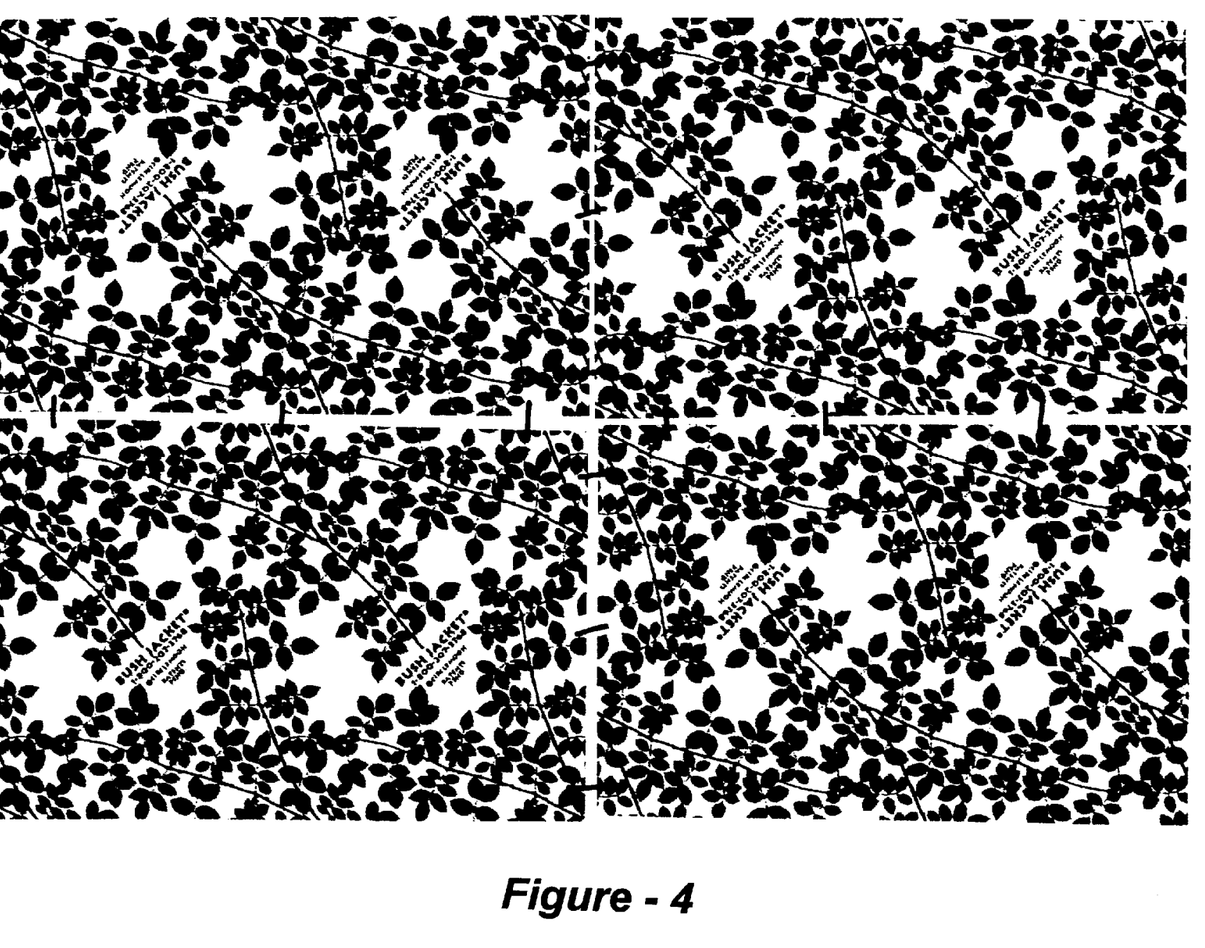
FIG. 4 is a drawing which shows how a plurality of material sheets according to the invention may be interconnected to provide for a larger covering.

Now turning to FIG. 4, an advantage of the invention is that multiple sheets may be joined along their edges, both horizontally and vertically, to accommodate larger plants or groupings of plants. For example, multiple sheets may be joined vertically to surround tall, narrow evergreens such as climbing roses, arbor vitae, and the like, or, the sheets may be joined horizontally, to accommodate plants with larger girths such as certain types of spruce, quince, and so forth. As shown in FIG. 4, a plurality of sheets may be joined both horizontally and vertically for even larger plant types, including tree trunks.

Figure 5A:
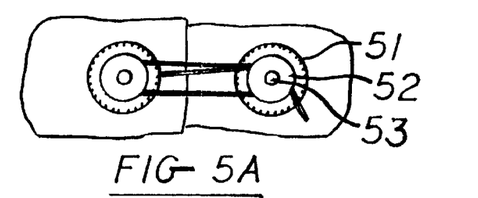
FIGS. 5A to 5T illustrate a variety of fasteners according to this invention.
Figure 5B:
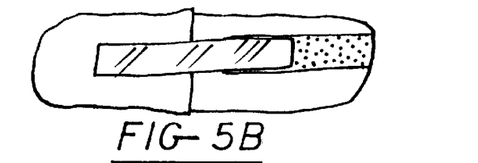
Figure 5C:
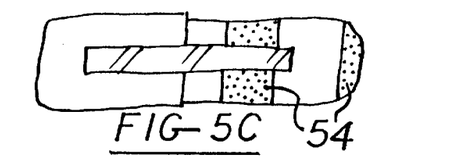
Figure 5D:
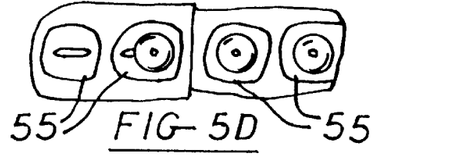
Figure 5E:
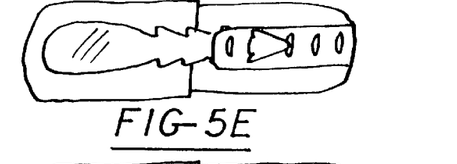
Figure 5F:
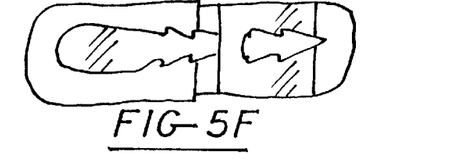
Figure 5G:
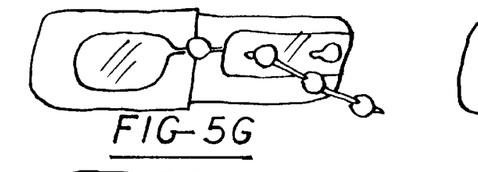
Figure 5H:
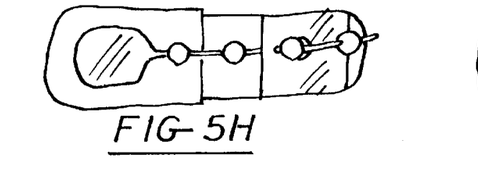
Figure 5I:
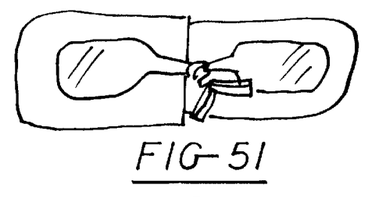
Figure 5J:
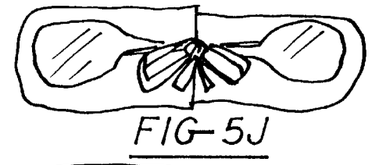
Figure 5K:
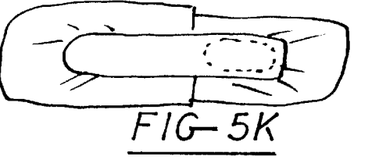
Figure 5L:
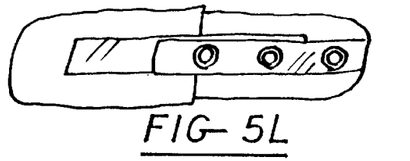
Figure 5M:
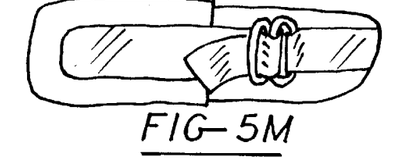
Figure 5N:
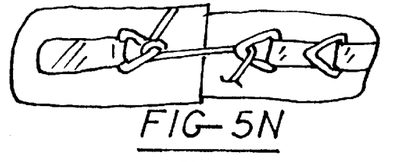
Figure 5O:
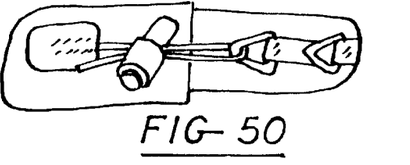
Figure 5P:
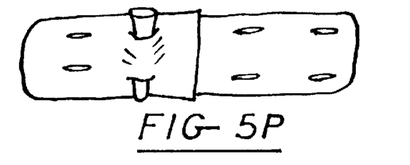
Figure 5Q:
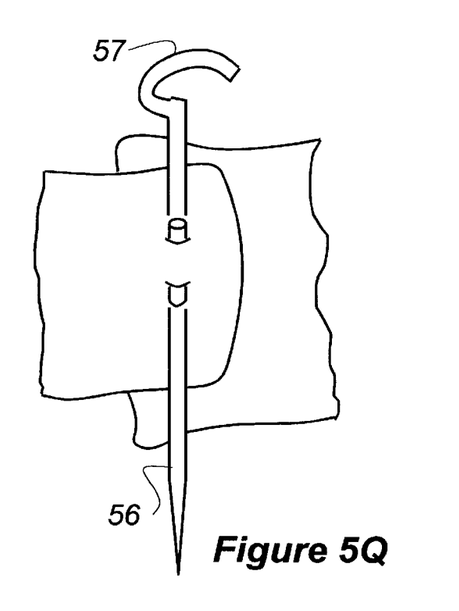
Figure 5R:
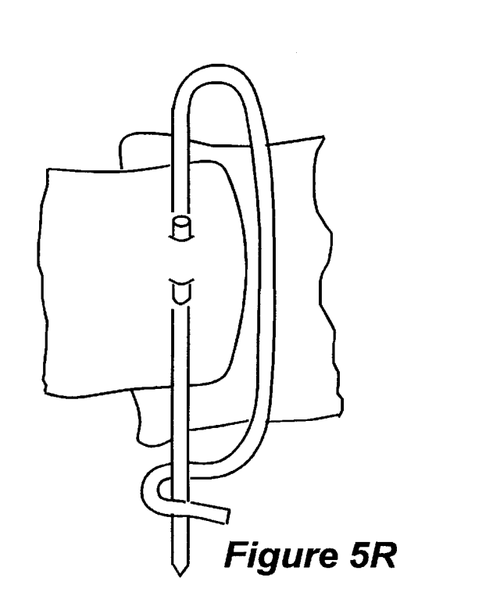
Figure 5S:
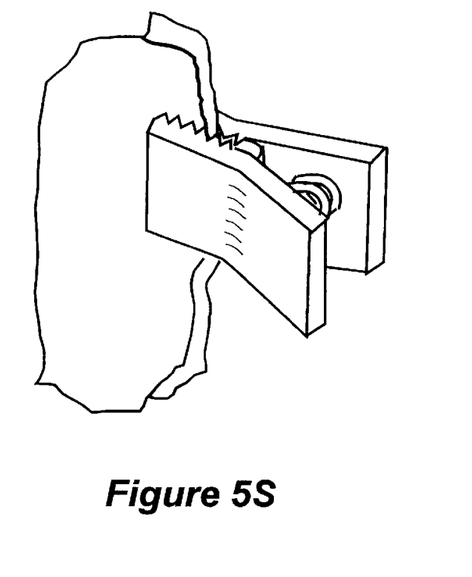
Figure 5T:
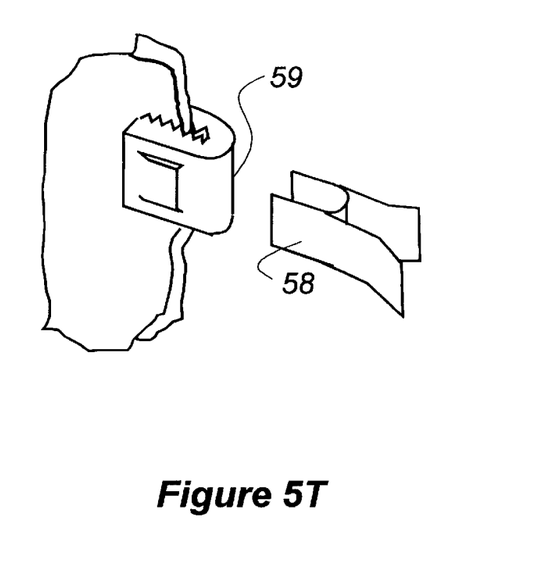

FIGS. 5A to 5T illustrate various alternative fasteners which may be used according to the invention, with the understanding that other fastener types are also applicable. FIG. 5A illustrates the use of a string and one or more capture devices, preferably in the form of a two-part disk. One portion of each disk, 51, is bonded or adhered to the outer surface of the wrapping material, whereas a second portion 52 is preferably attached to the first portion 51 through the use of a rivet 53. Various materials may be used for the string-capture device, such as vinyl or other plastics, and the rivet may also be plastic, or metal or other suitable alternatives.

The string-capture structure consisting of elements 51, 52 and 53 may be made as a unit and glued onto the outer surface of the wrapping material, with the portion 51 preferably including a number of small apertures, around its periphery, for example, enabling the adhesive, such as hot-melt glue, to seep through and provide a better bond. Alternatively, an additional disk may be placed on the inner side of the material, with the rivet 53 being applied through the entire stack of elements, so as to bind the resulting structure on both sides of the wrap for a strong attachment.

Various other bonding mechanisms may be used, with the general principle being that, in the preferred embodiment, the fasteners may undergo quite a bit of use without compromising their structural integrity. As mentioned earlier, the string used in conjunction with the capture devices may either be provided separately, in which case it will be wound around two or more of the capture devices to provide closure or, alternatively, the strings may be made available through a separate attachment to the material itself. That is, without necessarily using a capture device at the point where the string actually attaches to the material.

FIGS. 5B and 5C illustrate hook-and-loop or Velcro®-type material in use as a closure mechanism, noting that at least one aspect (54) may be provided in a vertical manner as opposed to a horizontal stripe. FIG. 5D shows how buttons may be used. As with the string-capture devices of FIG. 5A, reinforcement areas 55 are preferably used to ensure that the buttons do not pull off or that the slots do not readily tear. FIGS. 5E and 5F illustrate the use of plastic barb-type connector mechanisms, whereas FIGS. 5G and 5H illustrate the use of ball-capture-type devices. FIG. 5I shows how coated metal wires or "twister ties" may be used, whereas FIG. 5J shows how strings, without capture devices, may alternatively be employed.

In the event that the invention is intended to be discarded after use, permanent, as well as temporary closure devices may be used, including adhesive tape, as shown in FIG. 5K. Disposable versions of the invention are preferably made with a biodegradable material such as cellulose fiber that decomposes after one season. In FIG. 5L, plastic snaps are used to adjustably close the material around the plant to be protected. FIG. 5M shows the use of a buckle; FIG. 5N shows the use of a string and eyelets; FIG. 5O shows the eyelets in use with a spring-loaded type of manually adjustable capture device; and FIG. 5P illustrates how slits and removable pegs or other elements may alternatively be utilized.

FIG. 5Q illustrates how the removable element segment of FIG. 5P may, in fact, represent a portion of a longer elongated element such as a spike, nail, skewer or stake, preferably having a sharpened or semi-sharpened distal end 56 and a proximal end featuring some sort of loop or bend 57 to ensure that the device does not penetrate and fall through the overlapped material sheets. FIG. 5R illustrates yet a further example of the removal fastener of FIG. 5P, wherein the peg of FIG. 5P forms part of a safety-pin fastener or kilt pin which may be opened for installation and closed upon itself for securement. Such safety-pin fasteners are available in a variety of wire thicknesses, and usually contain an outer zinc, tin, brass or chrome plating to assist with rust prevention. Even large diaper pins or stapling may be used as alternatives.

FIG. 5S shows yet a further alternative fastener according to the invention, in this case a spring clip preferably having jaws with teeth to grab the material when installed. Spring-steel "binder clips" may be used, so may certain types of hair clips, though a sufficiently strong spring should be incorporated into the device to guarantee holding power throughout seasons of bad weather. FIG. 5T illustrates how, instead of a spring-loaded clip of the type shown in FIG. 5S, a clip having a separable applier may instead be used. In this case a tool 58 of some kind is used to spread apart, or to close a clip 59 again, preferably having teeth, with the tool being removed once the clip is in place. Certain types of garment fasteners are suitable according to this alternative embodiment, as are industrial versions of the types of fasteners used for "ace bandages," and the like.

Figure 6A:
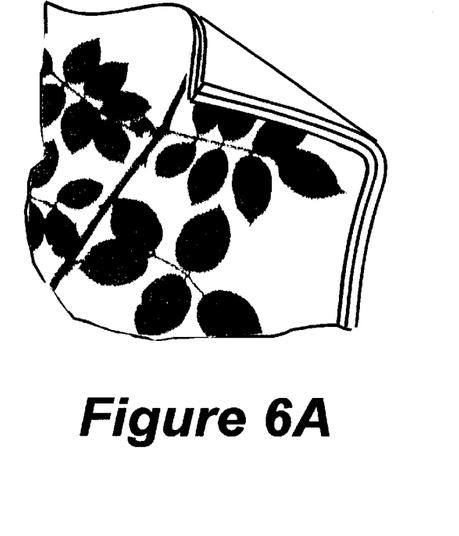
FIGS. 6A to 6D illustrate different multi-ply material constructions according to the invention, including structures with and without air gaps, quilting, and a foam insulating layer.
Figure 6B:
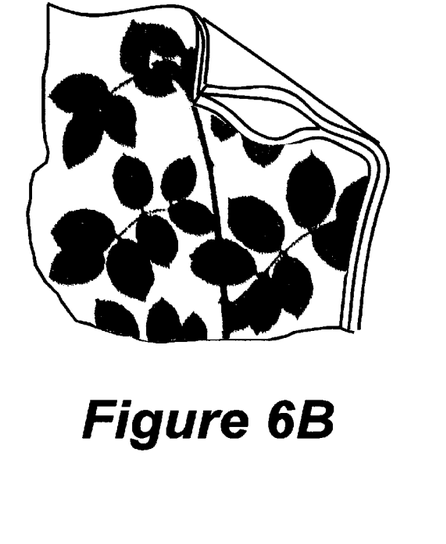
Figure 6C:
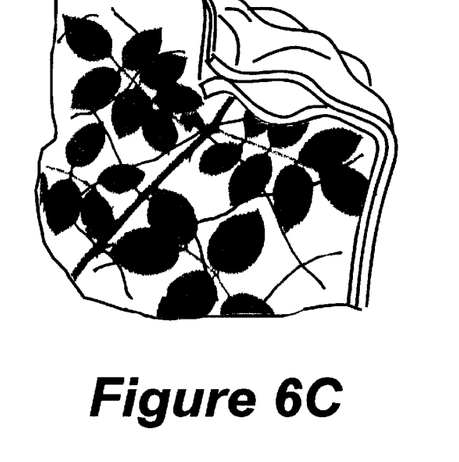
Figure 6D:
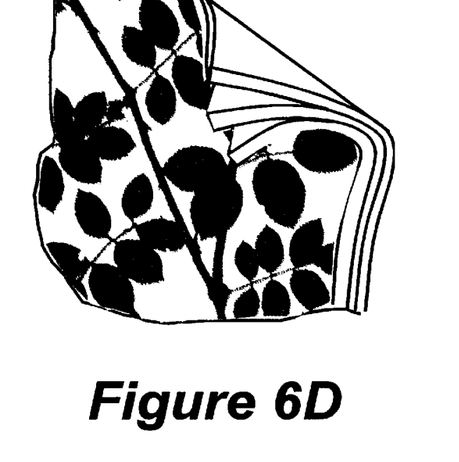

Although the wrap may be constructed of single-ply material, multiple plies may alternatively be employed with or without an air gap (FIGS. 6B and 6A, respectively) to create a more insulating barrier. Specifically, two or more plies of material may be quilted together as shown in FIG. 6C, with the internal pockets formed thereby being left unfilled, that is containing only air. Indeed, in one embodiment of the invention certain types of commercially available bubble-wrap materials may be used. As an alternative to air-filled pockets, a second, insulating layer may be bonded to a decorative outer material, as illustrated in FIG. 6D. For example, a layer of closed- or open-cell foam may be bonded to one or more outer layers, either continuously or with heat welding being used to create a quilted pattern, if desired. In a tree-wrapping application, the material may further include a pest-attracting and/or insect-capturing substance applied to the inside surface of the wrapping material, this substance being preferably exposed through the removal of a release layer.

Now turning to FIG. 7A, there is shown a method of obtaining an image suitable for use on a sheet of material according to the invention, wherein a camera 702 is used to gather an image of a living plant 704, which is then converted to a form for printing purposes. It should be understood that the camera 702 may be of the film type, or may be electronic and all digital, depending upon the technology available. In taking a photograph of a bush, however, which has a modified cylindrical shape, the portion of the center of the bush represented by "C" in FIG. 7A will have a flat appearance, whereas the two edges E1 and E2, will be compressed as the foliage follows its way around either side of the plant.

To correct for this apparent distortion, the aspect area shown in FIG. 7B may be modified, such that the two side areas may be expanded so as to flatten them out in agreement with the area C. Having performed this image manipulation, once printed on to the material, and wrapped around the plant to be protected, a more life-like appearance should be realized. As a further alternative, one may image a large grouping of plants at a distance, for example, using a telephoto lens, which would create a substantially flat image which could be used without further modification or a plurality of images may be gathered from different angles, as shown in FIG. 7C, and merged to produce an expanded image such as that depicted in FIG. 7B.

I claim:

1. A protective covering for a plant having a shape and a girth, comprising:
    a sheet of flexible material having a peripheral edge defining an area sized to permit wrapping of the material around the girth of the plant;
    a plurality of fasteners for securing the sheet of material onto the plant, including one or more removable, safety-pin type fasteners that may be selectively repositioned onto the sheet to enhance conformity with the shape of the plant.

2. The protective covering of claim 1, wherein the sheet of flexible material further includes a decorative floral pattern on at least one side thereof.

3. A protective covering for a plant having a shape and a girth, comprising:
    a sheet of flexible material having a peripheral edge defining an area sized to permit wrapping of the material around the girth of the plant;
    a plurality of fasteners for securing the sheet of material onto the plant, including one or more removable, spring-biased clothes-pin type fasteners that may be selectively re-positioned onto the sheet to enhance conformity with the shape of the plant.

4. The protective covering of claim 3, wherein the sheet of flexible material further includes a decorative floral pattern on at least one side thereof.

5. A protective covering for a plant having a shape and a girth, comprising:
    a sheet of flexible material having a peripheral edge, the material being cloth-like and readily conformable to the approximate shape of the plant being protected;
    a plurality of fasteners enabling at least a portion of the peripheral edge to be secured in an arrangement according to the shape of the plant; and
    wherein the material is at least semi-transparent to permit floral features of the plant to show through so that the material is less conspicuous when installed.

6. The protective covering of claim 5, wherein the sheet of flexible material further includes a decorative floral pattern on at least one side thereof.

7. The protective covering of claim 5, wherein the fasteners are removable, enabling the fasteners to be selectively re-positioned on the sheet to optimally conform to the shape of the plant.

8. A method of protecting one or more bushes of varying size from drying winter wind and other adverse environmental conditions, comprising the steps of:
    providing a flexible sheet of material;
    printing a decorative floral pattern onto at least one side of the sheet; and wherein
    the sheet has a peripheral edge defining an area sized to permit:
        a) wrapping of the sheet in full, uncut form around a single, large plant, and
        b) cutting of the sheet into multiple pieces having arbitrary dimensions to wrap a plurality of smaller plants on an individual basis; and securing the sheet as wrapped around each plant by binding at least a portion of the peripheral edge.

9. The method of claim 8, wherein the step of providing a flexible sheet of material includes the step of providing a sheet of material which does not unravel when cut.

10. The method of claim 9, wherein the sheet is a non-woven material.

11. The method of claim 10, wherein the sheet is a spun-bonded material.

12. The method of claim 8, wherein the decorative floral pattern is imprinted on at least one side of the material.

13. The method of claim 12, wherein the decorative floral pattern is silk-screened.

14. The method of claim 12, wherein the decorative floral pattern is imprinted using a flexographic process.

15. The method of claim 8, wherein the step of printing a decorative floral pattern onto at least one side of the sheet further includes the steps of:

generating a floral image defining an area substantially less than that of the sheet; and replicating the image across the sheet in a repeating manner.

16. The method of claim 8, wherein the step of printing a decorative floral pattern onto at least one side of the sheet further includes the steps of:

generating an image of a living plant;

converting the image into a form suitable for printing; and printing the converted image onto the sheet.

17. The method of claim 16, wherein the image of the living plant has an aspect ratio, and wherein the step of converting the image into a form suitable for printing includes the step of:

adjusting the aspect ratio so that the printed image appears more life-like when the sheet is wrapped around the plant.

* * * * *